United States Patent Office 3,585,223
Patented June 15, 1971

---

3,585,223
STABILIZED OILS AND FATS OF VEGETAL AND ANIMAL ORIGIN, AND METHOD OF PREPARING THE SAME
Hitoshi Enei, Kawasaki-shi, and Shinji Okumura, Ayako Mega, and Shizuyuki Ota, Tokyo, Japan, assignors to Ajinomoto Co., Inc., Tokyo, Japan
No Drawing. Filed Feb. 27, 1968, Ser. No. 708,503
Claims priority, application Japan, Mar. 4, 1967, 42/13,671
Int. Cl. C11b 5/00; A23d 5/04
U.S. Cl. 260—398.5         5 Claims

ABSTRACT OF THE DISCLOSURE

Small amounts of cystine stabilize fats of animal or vegetal origin against oxidation by atmospheric oxygen, and the stabilizing effect is greatly enhanced if the cystine is briefly heated in the fat or oil to a temperature between 140° C. and the decomposition temperature of the fat or oil. The heat-treated mixture may be diluted with untreated fat or oil to an ultimate concentration of 0.02% at least cystine, an ultimate concentration of 0.1 to 1.5% being preferred. The stabilizing effect achieved is far superior to that of butylated hydroxytoluene and of similar synthetic antioxidants used as their highest permissible concentration.

---

This invention relates to oils and fats of vegetal and animal origin, and particularly to fats and oils which are stabilized, and to a method of preparing the same.

The oils and fats of the type with which this invention is concerned are subject to oxidation by atmospheric oxygen, particularly at elevated temperature, as during the preparation of food. Attempts have been made to stabilize oils and fats by adding lecithin, isoascorbic acid, butylated hydroxyanisol (BHA), propyl gallate (PG), butylated hydroxytoluene (BHT), and isoamyl gallate. The known antioxidants, however, lose much of their effectiveness after heating to cooking or frying temperatures, and cannot be used in amounts sufficient to survive heat treatment in adequate concentrations because of government restrictions on their use.

We now have found that L-cystine or DL-cystine, when admixed to oils and fats in small amounts, provides good protection against oxidation, and that its stabilizing effect is not lost by heating.

This property of cystine is surprising. Although most amino acids are known to have some anti-oxidant effect, this effect is weak and is further reduced by exposure to the elevated temperatures commonly encountered in the cooking of foods and in frying. The unique stabilizing effect of cystine among the amino acids is evident from the data of Table 1 which lists peroxide values determined by the active oxygen method on a blank and on 20 ml. samples of soybean oil prepared by adding 5% by weight of the tested amino acid to 10 ml. oil, heating the mixture to 260° C. for 4 minutes, filtering the heated mixture, and diluting 5 ml. of the filtrate with 15 ml. untreated soybean oil. Each sample was subjected to three heating steps and the peroxide value was determined after each step. Each step involved heating at 140° C. for three hours. In the second step, the high-temperature treatment was followed by heating at 97.8° C. for one hour, and in the third step by heating at 97.8° C. for four hours.

TABLE 1

| Amino acid | Peroxide value after— | | |
|---|---|---|---|
| | First step | Second step | Third step |
| None | 109.1 | 189.5 | 440.0 |
| Cystine | 7.9 | 11.1 | 22.2 |
| Cysteine | 32.3 | 64.7 | 247.2 |
| Methionine | 61.8 | 97.0 | 231.0 |
| Glycine | 127.9 | 198.6 | 403.0 |
| Valine | 114.6 | 193.5 | 428.0 |
| Tryptophan | 92.9 | 110.4 | 250.0 |
| Serine | 106.0 | 174.5 | 470.0 |
| Arginine | 116.7 | 126.6 | 261.2 |
| Aspartic acid | 86.4 | 112.0 | 271.0 |
| Glutamine | 122.2 | 166.8 | 302.3 |

When cystine-containing samples briefly heated to 260° C. were stored at 32° C. for 40 days, the peroxide value was still well below 20.

Analogous results were obtained with other fats and oils of vegetal and animal origin, including the common edible and other oils and fats, such as cod-liver oil, lard, tallow, fish oil and chrysalis oil, linseed oil, cottonseed oil, safflower oil, rice oil, corn oil, palm oil, sesame oil, cacao oil, castor oil, and peanut oil. Similar effects are produced on fats and oils derived from microorganisms, such as yeast oil and Chlorella oil, on phospholipids, such as soybean lecithin and egg yolk lecithin, and on fat-dissolved vitamins, such as β-carotene, vitamin A and vitamin E.

Foods containing a high percentage of fats or oils are equally stabilized against oxidation by admixed cystine, and good results are obtained in cheese, butter, margarine, vegetable shortening, mayonnaise, ham, sausages, prepared salad dressings, potato chips, fried rice crackers, fried fish balls, and the like.

L-cystine or DL-cystine may be added to the fat or oil in the form of the free acid, as a non-toxic salt, or as an addition compound with a physiologically tolerated acid, such as hydrochloric acid, and these salts and acid addition compounds will be understood to be included in the terms "cystine" as employed hereinafter.

The amount of cystine to be added for adequate protection depends on the nature of the fat or oil and on the environment. Normally, at least 0.02% cystine, and equimolecular amounts of its salts and acid addition compounds are erquired for significant protection. Table 2 lists the peroxide values obtained on soybean oil samples prepared as described with reference to Table 1 to contain varying amounts of cystine and subjected to the aforedescribed three-step heat treatment. The results for untreated soybean oil, and for soybean oil containing the legally permissible maximum amount of BHT are also listed for comparison.

| Anti-oxidant | Percent | Peroxide value after— | | |
|---|---|---|---|---|
| | | First step | Second step | Third step |
| None | | 159.8 | 266.2 | 464.0 |
| Cystine | 1.0 | 4.6 | 6.8 | 14.0 |
| Do | 0.5 | 18.2 | 32.4 | 157.4 |
| Do | 0.1 | 93.8 | 162.0 | 322.0 |
| Do | 0.02 | 101.5 | 203.6 | 410.0 |
| BHT (0.02%) | | 162.0 | 261.2 | 456.7 |

Under most conditions, the amount of cystine should be between 0.1% and 1.5% of the fat to be stabilized. The stabilizing property of cystine is greatly enhanced by heat treatment at temperatures above 140° C., and preferably at 180° to 300° C. The optimum time of heat treatment is inversely related to the temperature, and should be 3 to 10 minutes at about 180° C., and shorter, though not substantially less than one minute at 260° to 300° C. The lower limit of 140° C. is critical, as will presently be shown, but the upper limit is determined mainly by the temperature of thermal decomposition of the fat or oil by chemical breakdown or partial volatilization. The cystine is activated by heat treatment in solution in the fat or oil to be protected, and only a small portion of the fat and oil need be used for preparing a concentrated cystine solution which is then heated and thereafter admixed to the bulk of the oil or fat.

The following examples further illustrate the invention, but should be understood not to limit the same.

EXAMPLE 1

10 ml. batches of soybean oil were mixed with 0.5 g. L-cystine, and the mixtures were heated respectively to 140°, 180°, 220°, 260°, and 300° C. for 3 minutes or for 6 minutes. Each treated batch was added to 40 milliliters untreated soybean oil, and the mixture was heated at 140° C. for three hours while air was blown through it at a rate of 310 ml. per minute. The samples activated at temperatures of 220° or more were additionally heated at 97.8° for three hours. Peroxide values were determined after the heat treatment at 140° C., and after one and three hours at 97.8° C. These values are listed in Table 3.

For comparison, an oil sample free from antioxidant and samples containing 0.02% of BHT, BHA, and PG respectively were subjected to the same heat treatment and aeration. The corresponding peroxide values are listed in Table 4. The superiority of cystine over the conventional materials is obvious. It will be noted that L-cystine as a normal ingredient of food is not subject to the narrow legal limitations applied to the synthetic antioxidants.

TABLE 5

| Oil or fat | Peroxide value | |
|---|---|---|
| | With cystine | Without cystine |
| Soybean oil | 6.0 | 140 |
| Rice oil | 4.6 | 140 |
| Palm oil | 2.6 | 35 |
| Tallow | 3.0 | 125 |
| Lard | 6.9 | 130 |
| Corn oil | 11.0 | 178 |

EXAMPLE 3

Soybean samples were mixed with 1% L-cystine by weight, and were heated for five minutes respectively to temperatures ranging from slightly above room temperature (25° C.) to 300° C. They were aerated for eight hours at 97.8° C. by bubbling air through them at a rate of 6.25 volumes/volume/minute.

The results listed below indicate the favorable results obtained even without significant heating, and the very substantial further improvement obtained by activating the stabilizer at temperatures above 140° C.

| Activation temp., ° C.: | Peroxide value |
|---|---|
| 25 | 40.2 |
| 120 | 38.2 |
| 140 | 32.8 |
| 180 | 7.2 |
| 220 | 2.0 |
| 260 | 2.6 |
| 300 | 4.1 |

EXAMPLE 4

Two batches of soybean oil containing 1% L-cystine were activated at 220° C. and 260° C. respectively for three minutes and filtered. One of each sample was then diluted with an equal volume of untreated oil. 20 ml. samples of each type of pretreated soybean oil and corresponding samples of untreated soybean oil and of soybean oil containing 0.02% BHT and 0.02% BHA re-

TABLE 3.—CYSTINE 1%

| | Activation time | | | | | | | | | |
|---|---|---|---|---|---|---|---|---|---|---|
| | Three minutes | | | | | Six minutes | | | | |
| Activation temp., ° C. | 140 | 180 | 220 | 260 | 300 | 140 | 180 | 220 | 260 | 300 |
| Peroxide value after— | | | | | | | | | | |
| 3 hrs. at 140° C. | 99.9 | 48.1 | 10.0 | 5.8 | 5.6 | 83.9 | 46.9 | 4.7 | 12.9 | 9.0 |
| 1 hr. at 97.8° C. | | | 24.1 | 10.9 | 13.1 | | | 8.5 | 17.8 | 12.6 |
| 3 hrs. at 97.8° C. | | | 18.5 | 10.0 | 25.7 | | | 15.8 | 24.0 | 72.5 |

TABLE 4

| | Peroxide value after— | | |
|---|---|---|---|
| Anti-oxidant | 3 hrs. at 140° C. | +1 hr. at 97.8° C. | +3 hrs. at 97.8° C. |
| None | 131.1 | 195.0 | 238.0 |
| BHT, 0.02% | 132.1 | 230.3 | 332.0 |
| BHA, 0.02% | 117.3 | 189.4 | 378.0 |
| PG, 0.02% | 115.7 | 180.6 | 342.0 |

EXAMPLE 2

Samples of soybean oil, rice oil, palm oil, tallow, lard, and corn oil were mixed with 1% cystine by weight, and the mixtures were heated for five minutes at 260° C. They were then subjected to aeration at 140° C. for three hours by bubbling 6.25 volumes of air through each volume of oil or molten fat per minute. The peroxide values of the several materials were determined after the aeration together with the peroxide values of correspondingly heated and aerated samples not stabilized by the addition of cystine. The results are listed in Table 5.

spectively were subjected to aeration with 125 ml. air at 140° C. for three hours, whereupon the peroxide values were determined. The results obtained are listed in Table 6.

TABLE 6

| Anti-oxidant: | Peroxide value |
|---|---|
| Cystine 1%, 220° C. | 7.4 |
| Cystine 0.5%, 220° C. | 19.7 |
| Cystine 1%, 260° C. | 4.6 |
| Cystine 0.5%, 260° C. | 18.2 |
| None | 159.8 |
| BHT, 0.02% | 162.0 |
| BHA, 0.02% | 159.0 |

Sesame oil when subjected to the same heat and aeration treatment had a peroxide value of 24.8.

While the invention has been described with particular reference to specific embodiments, it is to be understood that it is not limited thereto, but is to be construed broadly and restricted solely by the scope of the appended claims.

What is claimed is:

1. A method of stabilizing a fat or oil of vegetal or animal origin against oxidation which comprises adding an effective amount of cystine to said oil or fat, and heating the mixture at a temperature higher than 140° C. until the stability of said fat or oil in the presence of atmospheric oxygen at elevated temperature is significantly improved.

2. A method as set forth in claim 1, wherein said mixture after said heating is added to an additional amount of said fat and oil, the concentration of said cystine in the combined amounts of said fat and oil being at least 0.02%.

3. A method as set forth in claim 2, wherein said concentration is not substantially higher than 1.5% and said mixture is heated at said temperature for a period of not substantially less than one minute.

4. A method as set forth in claim 1, wherein said temperature is not substantially higher than 300° C.

5. A stabilized fat or oil prepared by the method of claim 2.

References Cited

Chemical Abstracts, vol. 45, 1951, p. 372f.
Chemical Abstracts, vol. 64, 1966, p. 8853d.

JOSEPH M. GOLIAN, Primary Examiner

U.S. Cl. X.R.

99—163